Aug. 14, 1962   H. B. FELDER   3,049,003
TORQUE MEASUREMENT APPARATUS
Original Filed Sept. 5, 1956
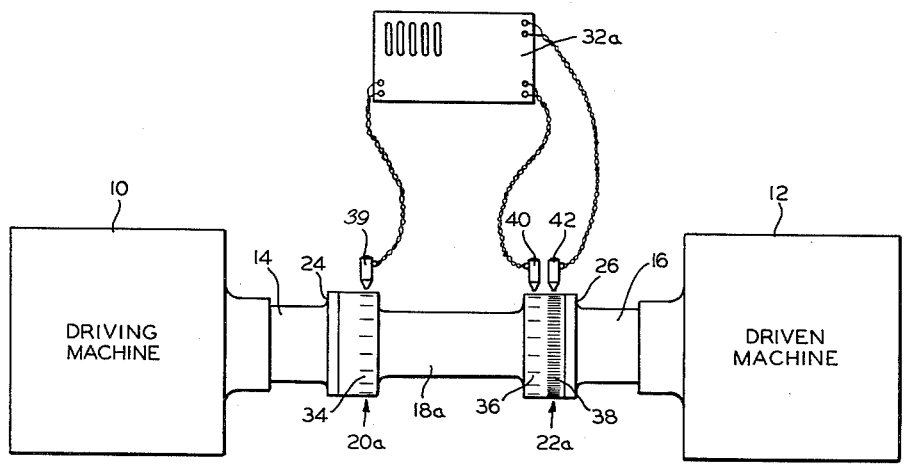
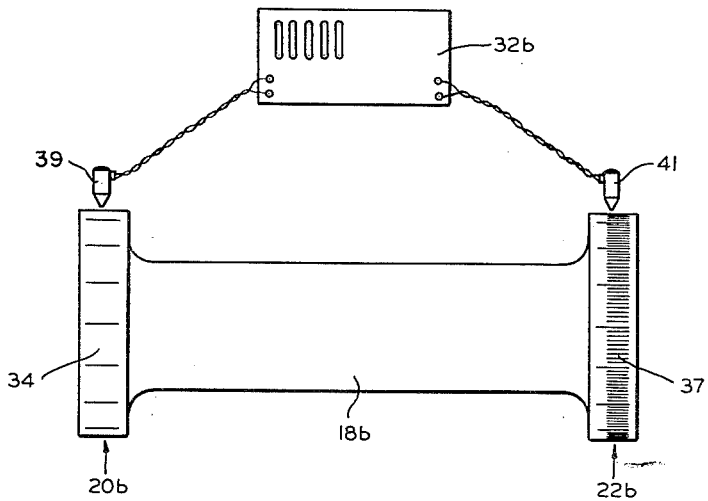
INVENTOR.
HOWARD B. FELDER
BY Kenneth C. Witt
ATTORNEY

United States Patent Office 3,049,003
Patented Aug. 14, 1962

3,049,003
TORQUE MEASUREMENT APPARATUS
Howard B. Felder, Berrien Springs, Mich., assignor to Clark Equipment Company, a corporation of Michigan
Original application Sept. 5, 1956, Ser. No. 608,146, now Patent No. 2,978,902, dated Apr. 11, 1961. Divided and this application July 8, 1960, Ser. No. 41,538
6 Claims. (Cl. 73—136)

The present application relates to apparatus for determining the twist in a shaft or other resilient member in order to determine the torque being transmitted by the shaft. This is a division of my copending application, Serial No. 608,146, filed September 5, 1956, now Patent No. 2,978,902.

Previous apparatus and mechanisms of this type have generally employed and been dependent upon a meter, oscilloscope, or other device which is subject to inaccuracies and variations depending upon adjustment, ambient conditions, age, voltage applied and other variables. It is the object of the present invention to eliminate inaccuracies and variations and provide a torque measuring apparatus which gives a uniform result not affected by such variables.

It is a further object of my invention to provide a torque measuring apparatus which is adaptable for the measurement of very large torques as well as moderate and smaller torques.

In carrying out my invention in one form, I provide a shaft which is torsionally resilient and has strain characteristics such that its "wind-up" caused by torque being transmitted through it is proportional to the torque. Flanges are provided at the ends of the shaft and these flanges are provided with very closely and uniformly spaced magnetic, optical or other indicia. In order to determine the wind-up of the shaft I employ a digital counter or other device to determine the torsional displacement of one of the flanges with respect to the other.

For a clearer and more complete understanding of my invention, reference should be had to the accompanying drawing in which:

FIG. 1 is a schematic illustration of one preferred embodiment of my invention, while FIG. 2 illustrates a modified embodiment.

Referring to the drawing, there is shown in FIG. 1 an arrangement of my apparatus for use in determining the torque transmitted from a driving machine 10 to a driven machine 12. The driving machine is provided with an output shaft 14 and the driven machine with an input shaft 16. Connected between these two shafts is a torsionally resilient member 18a which is illustrated herein as a metal shaft having flange portions 20a and 22a at the ends thereof. These two flange portions on shaft 18a are connected securely, in any suitable manner, to flange portions 24 and 26 respectively on the said output and input shafts.

In FIG. 1 flange 20a includes relatively widely spaced indicia 34 while flange 22a includes two sets of indicia. The indicia 34 are uniformly spaced around the periphery of flange 20a. One of the two sets of indicia on flange 22a, indicated by the numeral 36, is identical in number and spacing to indicia 34 and the individual indicia of 36 are in register with the indicia of 34 when member 18a is transmitting no torque, while the other set, denoted by the numeral 38, has indicia which are much more closely spaced, as indicated by the lines in this figure.

As illustrated the embodiment of FIG. 1 employs three magnetoelectric sensing heads, to sense the passage of indicia past the heads during rotation of member 18a. These sensing devices are connected to a counting device 32a which may, for example, be a Hewlett Packard 524B with 525A plug-in accessory. This counting device includes a "gate" (electronic) which is opened by one of the indicia 34 on flange 20a when it passes head 39. The gate is closed again by one of indicia 36 passing head 40. During the interval in which the gate is open, pulses picked up by the third magnetic head 42 from the finely spaced indicia pattern 38 are counted by device 32a. This number of pulses is proportional to the torque being transmitted. Thus, this invention provides a torque measurement apparatus which is in effect an intermittent sampling device.

One pickup head may be eliminated from the embodiment of FIG. 1 in some instances by combining the indicia 36 and 38, and I have shown in FIG. 2 a resilient member 18b having on the flange at the right end thereof indicia 37 which represent such a combination. In this case certain of the indicia 37, at the same intervals as 36 (and 34) are made to produce greater or otherwise different signals from the intervening closely spaced indicia which correspond to indicia 38. Sensing head 41 picks up all signals from indicia 37, both the "high" signals resulting from the widely spaced indicia (illustrated in FIG. 2 as longer than the others) and the remainder of the signals which result from the other intervening indicia. A suitable discriminating device added to the counter device 32a allows only the relatively strong or high signals to perform the gate closing function while the intervening closely spaced indicia are counted in the same manner as indicia 38 in FIG. 1.

While I have described and illustrated herein two preferred embodiments of my invention employing magnetic indicia and magneto-electric sensing means, it will be appreciated that other equivalent indicia and sensing means such as optical means, for example, may be substituted for the means described and illustrated herein if desired without departing from the present invention. For more information relative to optical indicia and sensing means which may be employed in practicing the present invention reference may be had to the aforementioned Patent No. 2,978,902 which relates to another torque measuring apparatus having both magnetic and optical embodiments.

It will be readily understood that my torque measurement apparatus may be adapted for small, medium or large torque measurements by selecting suitable proportions and characteristics for member 18a (or 18b as the case may be). The number of indicia, of course, may be varied to suit the application and to secure the accuracy required. The length and resiliency of the resilient member likewise may be selected to secure the necessary amount of torsional displacement to secure accurate results. Similarly, the flange members carrying the indicia may be made larger to secure the resolution and accuracy desired. In this connection it will be understood, of course, that it is not essential to my invention that the resilient member be provided with flanges. The indicia in some cases may be applied directly to the resilient member, or other equivalent means of applying these indicia may be employed.

Thus, while I have disclosed herein certain preferred embodiments of my invention it will be understood that I do not intend to be limited thereto, but I intend to cover by the appended claims all modifications which fall within the true spirit and scope of my invention.

I claim:

1. A torque measurement apparatus comprising an elongated torsionally resilient rotatable member arranged to be connected between a driving and a driven machine, two circular indicia carrying portions located in coaxial spaced-apart relation on the said resilient member, means for deriving signals from the said indicia carrying portions, and indicia counting means responsive to said signals for determining the quantity of indicia on one said indicia carrying portion passing a reference point adjacent thereto during an interval determined by the torsional displacement of one of the said indicia carrying portions with respect to the other.

2. A torque measurement apparatus comprising an elongated torsionally resilient rotatable member arranged to be connected between a driving and a driven machine, a first indicia carrying portion on the said resilient member located adjacent one end thereof, a second indicia carrying portion on the said resilient member located adjacent the other end thereof, and indicia counting means actuated jointly by the indicia on the said first and second indicia carrying portions for counting the indicia on the said second indicia carrying portion which pass a given point during an interval determined by the torsional displacement of one indicia carrying portion with respect to the other indicia carrying portion.

3. A torque measurement apparatus comprising an elongated torsionally resilient rotatable member arranged to be connected between a driving and a driven machine, a first circular portion on the said resilient member adjacent one end thereof, a second circular portion on the said resilient member adjacent the other end thereof, a first set of indicia on the said first circular portion arranged in equally spaced relation around the periphery of the first circular portion, a second set of indicia on the said second circular portion comprising the same number of indicia as on the said first circular portion and arranged in equally spaced relation around the periphery of the second circular portion, a third set of indicia on the said second circular portion comprising a larger quantity of indicia than the said first and second sets, the indicia of the said third set also being arranged in equally spaced relation around the periphery of the said second circular portion, a counting device, first and second sensing heads located respectively adjacent the said first and second sets of indicia for actuating the said counting device, and a third sensing head located adjacent the said third set of indicia, the said counting device being arranged to indicate the torque transmitted through the said resilient rotatable member responsively to the number of indicia of the said third set passing the said third sensing head during an interval determined by the torsional displacement of one said circular portion with respect to the other said circular portion.

4. A torque measurement apparatus comprising an elongated torsionally resilient rotatable member arranged to be connected between a driving and a driven machine, a first circular portion on the said resilient member adjacent one end thereof, a second circular portion on the said resilient member adjacent the other end thereof, a first set of indicia on the said first circular portion arranged in equally spaced relation around the periphery of the first circular portion, a second set of indicia on the said second circular portion, the said second set of indicia comprising a first group of indicia the same in number as the said first set and arranged in equally spaced relation around the periphery of the second circular portion and a second group of more closely spaced indicia located between the indicia of the said first group and in equally spaced relation around the periphery of the second circular portion, a counting device, first and second sensing heads located respectively adjacent the said first and second sets of indicia for actuating the said counting device, and the said counting device being arranged to indicate the torque transmitted through the said resilient rotatable member responsively to the number of indicia of the said second set passing the said second sensing head during an interval determined by the torsional displacement of one said circular portion with respect to the other said circular portion.

5. A torque measurement apparatus comprising an elongated torsionally resilient rotatable member arranged to be connected between a driving and a driven machine, a first circular portion on the said resilient member adjacent one end thereof, a second circular portion on the said resilient member adjacent the other end thereof, a first set of indicia on the said first circular portion arranged in equally spaced relation around the periphery of the first circular portion, a second set of indicia on the said second circular portion comprising the same number of indicia as on the said first circular portion and arranged in equally spaced relation around the periphery of the said second circular portion, a third set of indicia on the said second circular portion comprising a larger quantity of indicia than the said first and second sets, the indicia of the said third set also being arranged in equally spaced relation around the periphery of the said second circular portion, and indicia counting means actuated jointly by the indicia of the said first and second sets for counting the indicia of the said third set which pass a reference point during an interval determined by the torsional displacement of one said circular portion with respect to the other said circular portion.

6. A torque measurement apparatus comprising an elongated torsionally resilient rotatable member arranged to be connected between a driving and a driven machine, a first circular portion on the said resilient member adjacent one end thereof, a second circular portion on the said resilient member adjacent the other end thereof, a first set of indicia on the said first circular portion arranged in equally spaced relation around the periphery of the first circular portion, a second set of indicia on the said second circular portion, the said second set of indicia comprising a first group of indicia the same in number as the said first set and arranged in equally spaced relation around the periphery of the second circular portion and a second group of more closely spaced indicia located between the indicia of the said first group and in equally spaced relation around the periphery of the second circular portion, means for deriving signals from the said indicia carrying portions, and indicia counting means responsive to said signals for determining the quantity of indicia of the said second group passing a reference point adjacent the second circular portion during an interval determined jointly by the action of the said first set of indicia and the said first group of the second set of indicia, for determining the torsional displacement of one of the said circular portions with respect to the other.

References Cited in the file of this patent

UNITED STATES PATENTS 2,586,540    Holden             Feb. 19, 1952

FOREIGN PATENTS 600,980    Great Britain        Apr. 23, 1948